Oct. 11, 1949.   A. B. CLUNAN ET AL   2,484,780
WRAPPING MACHINE AND METHOD OF WRAPPING
Filed April 30, 1946   2 Sheets-Sheet 1

INVENTORS
ALBERT B. CLUNAN
JOSEPH F. STALTER
BY R.H. Waters

Oct. 11, 1949.    A. B. CLUNAN ET AL    2,484,780
WRAPPING MACHINE AND METHOD OF WRAPPING
Filed April 30, 1946    2 Sheets-Sheet 2
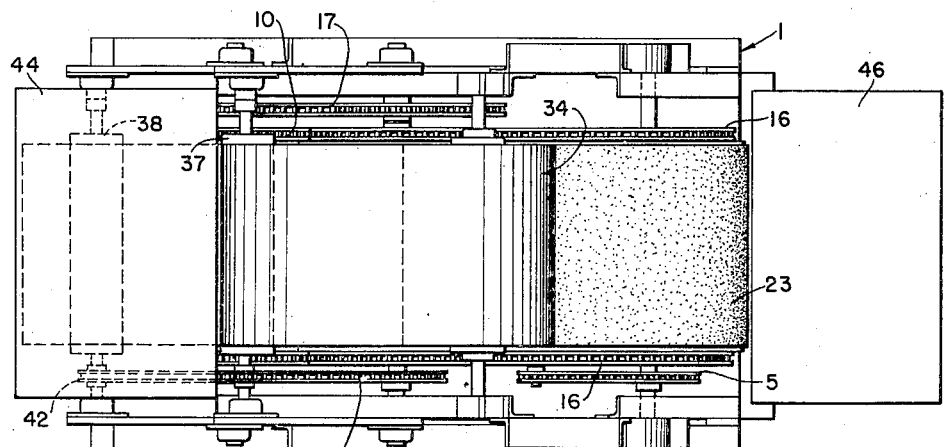
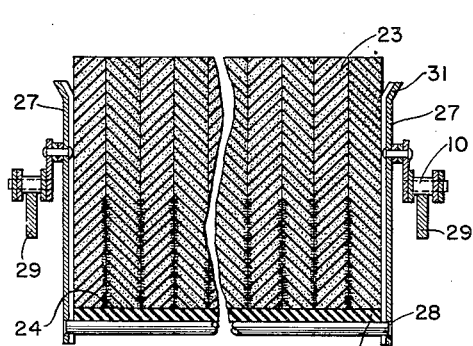
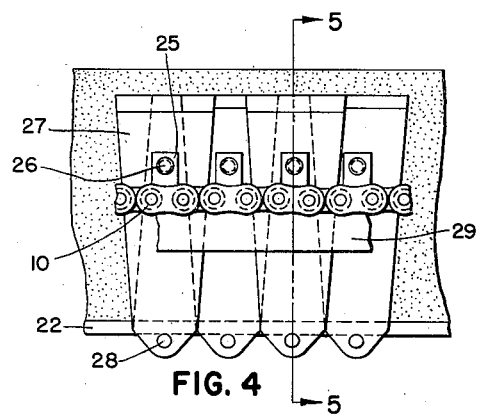
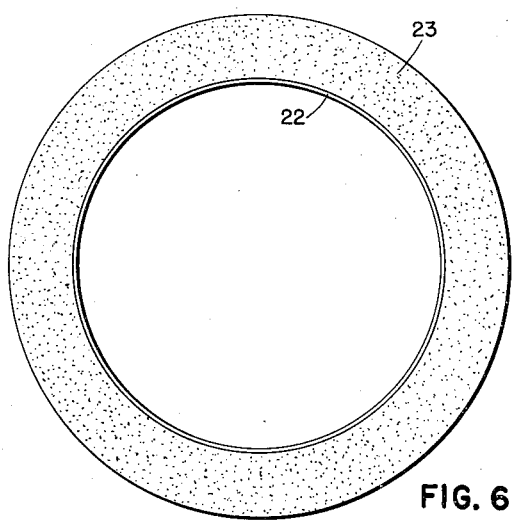
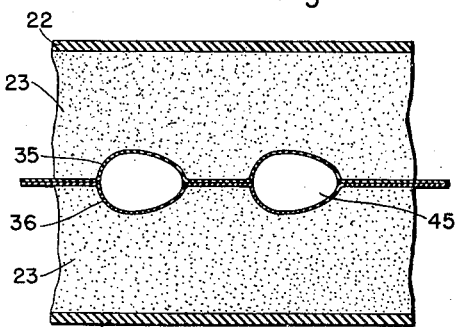
INVENTORS
ALBERT B. CLUNAN
JOSEPH F. STALTER
BY
R.H. Waters Patented Oct. 11, 1949

2,484,780

UNITED STATES PATENT OFFICE 2,484,780

WRAPPING MACHINE AND METHOD OF WRAPPING

Albert B. Clunan and Joseph F. Stalter, Akron, Ohio, assignors to Wingfoot Corporation, Akron, Ohio, a corporation of Delaware Application April 30, 1946, Serial No. 666,134

22 Claims. (Cl. 18—19)

The present invention relates to wrapping machines and to a method of wrapping articles. Particularly, it is an object of this invention to provide a machine for securely wrapping objects regular or irregular in shape in a heat-sealable wrapping material in such a manner that the material closely embraces the article and hermetically seals the article in order to preserve it and keep it sanitary.

Another object of this invention is to provide a machine in which sponge rubber or other highly yieldable and deformable material is employed to impress the wrapping material about the article to be wrapped and to press overlapping layers thereof into firm engagement with each other to cause the heat-sealable material (previously plasticized by suitable heated elements) into heat-sealing relation and hold the material in this relation for an appreciable period of time to cause a proper sealing thereof. In the embodiment shown, this is accomplished primarily by the use of opposed belts covered throughout their peripheries with sponge rubber or similar material, the surfaces of which engage the opposed sheets of material which are used to wrap the article.

Other objects of this invention will appear hereinafter as the description of the invention proceeds, the novel features, arrangements, and combinations being clearly pointed out in the specification and in the claims thereunto appended.

In the drawings:

Figure 3 is a plan view of the machine;

Figure 4 is a fragmentary side elevation of the belt and associated supporting means;

Figure 5 is a vertical cross-section taken through the lower belt and associated mechanism substantially along line 5—5 of Figure 4;

Figure 6 is a side elevation showing the manner in which the belt is initially formed; and Figure 7 is a side elevation somewhat diagrammatical showing on the enlarged scale the manner in which the articles are wrapped.

Figure 1:
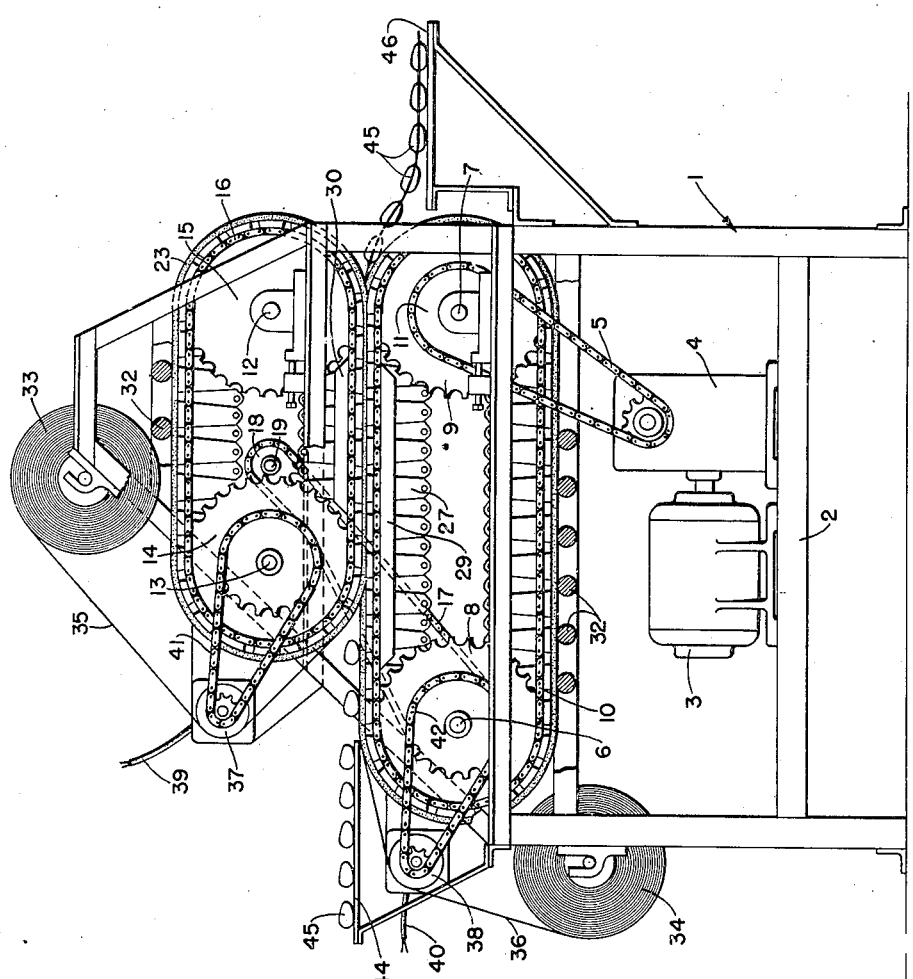
Figure 1 is a side elevation of a machine embodying my invention with parts thereof broken away for the sake of clearness.
Figure 2:
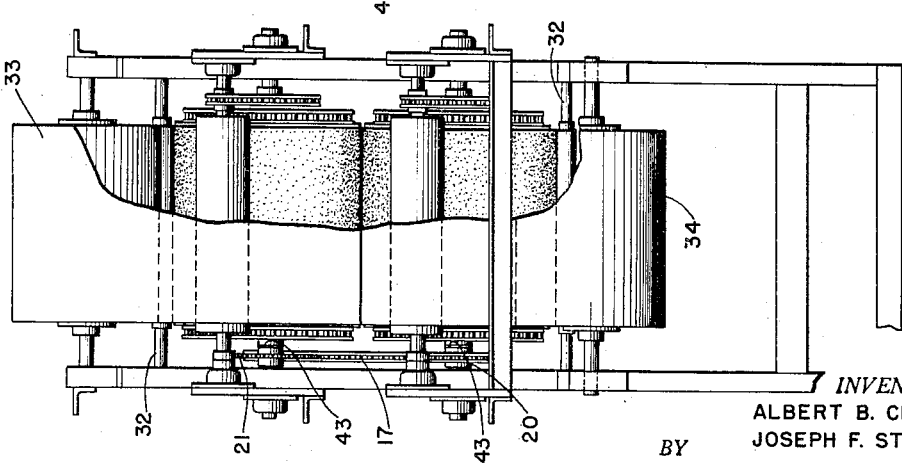
Figure 2 is an end elevation of the machine shown in Figure 1 and looking from the left in that latter figure with certain parts omitted for the sake of clearness.

Referring now particularly to Figures 1 and 2, the reference character 1 indicates generally the framework of the machine and 2 a platform on the frame supporting a motor 3 operating through gear reduction mechanism 4 to drive a chain or belt 5 which in turn drives the mechanism of this machine.

Shafts 6 and 7 carry sprockets 8 and 9 respectively over which is trained a chain 10 engaging the sprockets and being driven by the sprocket 9 or, if desired, by the sprocket 8, depending upon whether the shaft 7 or the shaft 6 is driven by the chain 5. In the present instance, for the sake of convenience, the shaft 7 is shown as being driven and, to this end, it is provided with a sprocket 11 over which the chain 5 is trained.

Similarly, there are a pair of shafts 12 and 13 carrying sprockets 14 and 15 over which is trained a chain 16. The shaft 13 is driven from the shaft 6 by means of a chain 17 trained over an idler sprocket 18 on a shaft 19 and a sprocket 20 secured to the shaft 6. The chain 17 engages a sprocket 21 on the shaft 13 to drive the shaft 13 and, in consequence, the chain 16 by the means heretofore described. Leaving out for the moment the details of the belts which literally are carried by the chains 16 and 10, it will be seen that, through the driving mechanism just described, the adjacent runs of the chains 16 and 10 will be traveling in the same direction.

In Figure 6 is shown an ordinary belt 22 which may be of leather but is preferably of rubberized fabric preformed to a substantially circular shape of the required dimensions.

A plurality of annular-shaped pieces of sponge rubber 23 in the form of flat discs are either preformed to the desired shape or cut to the desired shape from a sheet of sponge rubber and placed so as to encircle the belt as shown in Figure 6, the several annular pieces being plied up so as to form a series of layers of sponge rubber laterally of the belt as shown in Figure 5.

These discs of sponge rubber are bonded at their inner peripheries at the surface of the belt by any suitable means such as rubber cement and the adjacent layers are bonded to each other by a layer of cement or the like to a distance of about ½ their width as illustrated by the reference character 24 in Figure 5. This makes a unitary structure of the inner part of the composite annulus while leaving the outer portions of the discs free, except for the frictional contact between the same. In this manner, the various discs may yield to pressure more or less independently of adjacent discs for a purpose which will appear later on in the description of this invention. Instead of making the sponge rubber layer as just described, it is possible to make one continuous layer of sponge rubber the full width of the belt and then, by rotating the belt and sponge rubber, cut slits in the surface of the sponge rubber by means of a suitable knife impressed against the surface thereof. While a unitary sponge rubber surface might prove satisfactory for wrapping certain objects, it has been found that the use of a series of discs which are not interconnected at the outer edges will effect a better wrapping of articles having sharp or irregular contours.

As stated before, the chains 10 and 16 support and drive the belts or presser elements. As best illustrated in Figures 4 and 5, alternate links of the chain carry vertically extending projections 25 on which are mounted the pins 26 which act as supports for the plates 27. The plates 27 at their lower ends are provided as best shown in Figure 5 with transversely extending rods 28 which, if desired, may be so mounted as to rotate. The rods 28 lie directly beneath the belt 22 and form with the plates 27 a saddle for supporting the belt. The lower ends of adjacent plates 27 are connected to the same rod 28 and overlap each other to form a continuous wall alongside of the sponge rubber belt whereby, when vertical pressure is placed on the sponge rubber, it will not expand laterally. In order to prevent any sagging of the belt due to a downward deflection of the chain (or an upward deflection as in the case of the upper belt) there are provided the guides 29 for the lower chain and 30 for the upper. These engage the rollers on the chain and prevent sagging of the chain and, consequently, of the belts.

The plates 27 not only act as supporting means for the belts, but they also act as means for preventing outward bulging of the sponge rubber when a pressure is exerted on the upper surface thereof. These plates overlap at their inner ends when the chain is passing over the sprockets and the outer ends thereof overlap to a lesser extent but still sufficiently to support the sponge rubber laterally to accomplish the purposes for which they were designed. The upper edges of the plates are preferably flared outward slightly as at 31 in order not to cut into the sponge rubber when pressure is exerted thereon.

Since the belts which carry the sponge rubber rely for their driving on the engagement of the belts 22 with the pins 28, the rollers 32 which tend to press the belts 22 against the pins 28 on the non-working runs of the belts are provided.

The wrapping material is preferably a heat-sealable rubber hydrochloride film which, upon application of heat, becomes stretchable and tacky so that adjacent layers of same, when pressed together, will adhere and effect a sealing of the layers. One such material is shown in the patent to Calvert No. 1,989,632, but the invention is not limited to this particular wrapping material. The material is wound upon two rolls 33 and 34 and the material itself is indicated at 35 and 36 and, being respectively the upper and lower wrapping materials as shown in Figure 1, the wrapping materials 35 and 36 pass over the heated rolls 37 and 38, heated preferably electrically in any desired manner; and, in the drawings, there are illustrated the cords 39 and 40 leading to the cylinders and adapted to convey current to the heating elements in the rollers. These rollers are respectively driven from the shafts 13 and 6 by chains 41 and 42 trained over suitable sprockets (not numbered) on the shafts 13 and 6 and the shafts which carry the rolls 37 and 38 (see Fig. 1). The gearing which drives the rolls 37 and 38 is so designed as to drive these rolls at a surface speed equal to the surface speed of the outer surface of the sponge rubber at the point where the two sponge rubber belts come in contact with each other. From a practical standpoint, however, it has been found that it is difficult to drive these at the same speed as some slippage occurs and, therefore, on the shafts 13 and 6 I provide friction clutches 43 (Fig. 2) and the gearing is designed to drive the rolls slightly in excess of the necessary speed. These friction clutches are adjusted to a rather light tension so that a small amount of drag on the rolls 37 and 38 will cause the clutches to slip. This drag results from the friction between the shafts carrying the rolls 33 and 34 and their bearings, but special friction means may be provided if desired.

The framework is provided with a worktable 44 upon which objects 45 are placed prior to wrapping them. The operator then moves the object onto the material on the lower belt and the object is carried by that material into the bite between the upper and lower belts. As the objects enter the bite, they are engaged by the upper layer of wrapping material 35. The said wrapping material having previously passed over the rollers 37 and 38 are in a tacky adherent condition and, as the objects pass between the opposed belts, the two layers of wrapping material are pressed firmly against the objects and with each other to seal the objects between the layers of wrapping material. The soft sponginess of the sponge rubber presses the material firmly about the objects into close embracing relation therewith. It is for this reason that the sponge rubber belts are made up of a series of layers transversely so that, in effect, there are a multiplicity of individual fingers pressing the wrapping material against the objects instead of having one continuous surface for accomplishing this purpose. With a solid mass of sponge rubber used on the surface, the same would not accommodate itself as readily to the shape of the object as where the individual fingers are employed. This is particularly true of objects which may be more or less square at the ends and which may require that the material of the belts force itself upward and downward along the more or less flat ends of the object.

By using the opposed sponge rubber surfaces of considerable extent in the direction in which the articles are fed, it is possible to prevent trapping air in the package to a greater extent than with prior-known methods. The forward end of the article is wrapped first and, as the wrapping progresses toward the other end of the article, a firm pressure is maintained on the wrapped portion. As a result, there will be little, if any, probability that any air will be forced into the forward end of the wrapper. If the wrapper around the forward end of the article were not firmly held against the article during the wrapping of the rest of the article, the wrapper would be free to move away from the article to receive air between it and the article during the wrapping of the rear end thereof. Therefore, by this method, the wrapper is held snugly against the article.

The material, after it is wrapped, is discharged from between the belts onto a worktable 46. In Figure 7, there is illustrated on an enlarged scale the manner in which the sponge rubber forces the wrapping material closely about the objects being wrapped. Actually, it would not be absolutely necessary to drive the rolls 37 and 38 since the material would be pulled from the rolls 33 and 34 by the engagement of the belts with the material, but it is preferred to relieve some of the tension in the film between the rolls and the belts for the reason that the material at this position is heated and stretched and the belts would in all probability tend to stretch the wrapping material unless there was a positive driving of the material by means of the rolls.

It is to be understood that the embodiment of the invention shown in the drawings is only by way of illustrating and is not to be considered as limiting the scope of the invention. Various other arrangements and combinations are clearly within the scope of this invention and, therefore, the invention is not limited except as hereinafter defined in the claims hereunto appended.

Having thus fully described our invention, what we claim and desire to secure by Letters Patent of the United States is:

1. In a wrapping machine, the combination with a pair of opposed belts, the bodies of the belts being deep layers of soft yieldable material inherently compressible and conformable to irregularities of objects placed therebetween, means for driving said belts, of means for feeding overlapping layers of heat-sealable wrapping material between said belts, means for directing the overlapping layers along converging paths into a position between said belts to provide a space therebetween for the insertion of an article to be wrapped, and means for heating the wrapping material prior to its passing between said belts.

2. In a wrapping machine, the combination with a pair of opposed belts, the surfaces of the belts being of sponge rubber material conformable to irregularities of objects placed therebetween, means for driving said belts, of means for feeding overlapping layers of heat-sealable wrapping material between said belts, means for directing the overlapping layers along converging paths into a position between said belts to provide a space therebetween for the insertion of an article to be wrapped, and means for heating the wrapping material prior to its passing between said belts.

3. In a wrapping machine, the combination set forth in claim 1 in which said belts are made up of radially extending layers.

4. In a wrapping machine, the combination set forth in claim 2 in which said belts are made up of radially extending layers extending parallel to the belt travel.

5. In a wrapping machine, the combination with a pair of opposed belts normally in engagement with each other when there is no wrapping material therebetween, the bodies of the belts being deep layers of soft yieldable material conformable to irregularities of objects placed therebetween, means for driving said belts, of means for feeding overlapping layers of heat-sealable wrapping material between said belts, means for directing the overlapping layers along converging paths into a position between said belts to provide a space therebetween for the insertion of an article to be wrapped, and means for heating the wrapping material prior to its passing between said belts comprising heated rotatable rollers adapted to engage the wrapping material.

6. In a wrapping machine, the combination with a pair of opposed belts normally in engagement with each other when there is no wrapping material therebetween, the bodies of the belts being deep layers of soft yieldable material conformable to irregularities of objects placed therebetween, means for driving said belts, of means for feeding overlapping layers of stretchable heat-sealable wrapping material between said belts, means for directing the overlapping layers along converging paths into a position between said belts to provide a space therebetween for the insertion of an article to be wrapped, and means for heating the wrapping material prior to its passing between said belts comprising rotatable rollers, and means for driving said rollers at a surface speed substantially equal to the linear speed of the material as it passes between said belts.

7. In a wrapping machine, the combination with a pair of opposed belts normally in engagement with each other when there is no wrapping material therebetween, the bodies of the belts being deep layers of soft yieldable material conformable to irregularities of objects placed therebetween, means for driving said belts, of means for feeding overlapping layers of stretchable heat-sealable wrapping material between said belts, means for directing the overlapping layers along converging paths into a position between said belts to provide a space therebetween for the insertion of an article to be wrapped, and means for heating the wrapping material prior to its passing between said belts comprising rotatable rollers, and means including clutches for driving each of said rollers at a surface speed substantially equal to but less than the linear speed of the belt surfaces, whereby, whenever the speed of the belts lessens, the rollers will retard to prevent advance of the wrapping material at a speed greater than the surface speed of the belts, and means in advance of said rollers for imparting a drag on said material to effect slippage of said clutches when the surface speed of the belts becomes greater than the linear feed of said material.

8. In a wrapping machine, the combination with a pair of opposed belts normally in engagement with each other when there is no wrapping material therebetween, the surfaces of the belts being of sponge rubber material conformable to irregularities of objects placed therebetween, means for driving said belts, of means for feeding overlapping layers of stretchable heat-sealable wrapping material between said belts, means for directing the overlapping layers along converging paths into a position between said belts to provide a space therebetween for the insertion of an article to be wrapped, and means for heating the wrapping material prior to its passing between said belts comprising rotatable rollers, and means including clutches for driving each of said rollers at a surface speed substantially equal to but less than the linear speed of the belt surfaces, whereby, whenever the speed of the belts lessens, the rollers will retard to prevent advance of the wrapping material at a speed greater than the surface speed of the belts, and means in advance of said rollers for imparting a drag on said material to effect slippage of said clutches when the surface speed of the belts becomes greater than the linear feed of said material.

9. A presser element for wrapping machines comprising at least one presser comprising a presser belt made of sponge rubber laminations parallel to the length of the belt and at a substantial angle to the outer operative surface thereof.

10. The method of wrapping articles which comprises the steps of placing articles to be wrapped between layers of heated heat-sealable material at a temperature to effect sealing of the layers, and pressing the material about the articles between two substantially flat surfaces of sponge rubber moving parallel and rectilinearly in the same direction.

11. The method of wrapping articles which comprises the steps of placing articles to be wrapped between layers of heated heat-sealable material at a temperature to effect sealing of the layers, and pressing the material about the articles between two substantially flat rectilinearly moving surfaces of sponge rubber made up of parallel layers extending substantially perpendicular to the pressing surfaces.

12. In a wrapping machine, the combination with means for feeding wrapping material along a predetermined path, presser means arranged along said path for pressing the material around the article comprising at least one endless belt having a body which is a deep layer of soft yieldable material supported by a series of interconnected saddle members extending underneath and upwardly along the sides of said belt, said saddle members being interconnected and means for driving said saddle members along a closed path.

13. On a wrapping machine such as set forth in claim 12 in which the upwardly extending portions of said saddle members are overlapping to provide a substantially continuous lateral support for said belt.

14. The method of wrapping articles which comprises the steps of moving layers of wrapping material into superimposed relation, placing articles to be wrapped between said layers and moving the superimposed layers and articles between moving parallel layers of inherently compressible material having their opposed surfaces normally so positioned with respect to each other that the compressible material is in compression throughout an extended area, whereby to press the layers firmly about the article and into contacting engagement with each other in the areas around the article, and sealing the contacting areas together.

15. The method of wrapping articles which comprises the steps of moving layers of wrapping material into superimposed relation, placing articles to be wrapped between said layers and moving the superimposed layers and articles between moving parallel layers of sponge rubber having their opposed surfaces normally so positioned with respect to each other that the sponge rubber is in compression throughout an extended area, whereby to press the layers firmly about the article and into contacting engagement with each other in the areas around the article, and sealing the contacting areas together.

16. The method of wrapping articles which comprises the steps of moving layers of thermoplastic, thermosealing material into superimposed relation, placing articles to be wrapped between said layers and moving the superimposed layers and articles between moving parallel layers of sponge rubber having their opposed surfaces normally so positioned with respect to each other that the sponge rubber is in compression throughout an extended area, whereby to press the layers firmly about the article and into contacting engagement with each other in the areas around the article, and sealing the contacting areas together.

17. The method of wrapping articles which comprises the steps of moving layers of thermosealing wrapping material into superimposed relation, placing articles between said layers, heating said layers to a temperature to make them tacky, and moving the superimposed layers and articles between moving, substantially parallel layers of soft, inherently highly compressible material having their opposed surfaces normally so positioned with respect to each other that each acts to compress the other throughout a considerable area in the direction of movement thereof, whereby to press the layers of wrapping material snugly about the articles and into engagement with each other outside of the boundaries of said articles to cause the layers to adhere together and seal the article between the layers.

18. The method of wrapping articles which comprises the steps of moving layers of thermosealing wrapping material into superimposed relation, placing articles between said layers, heating said layers to a temperature to make them tacky, and moving the superimposed layers and articles between moving substantially parallel layers of soft, inherently highly compressible material having their opposed surfaces normally so positioned with respect to each other that each acts to compress the other throughout a considerable area in the direction of movement thereof, laterally supporting the compressible material to prevent outward expansion perpendicular to the direction of movement of the material, whereby to press the layers of wrapping material snugly about the articles and into engagement with each other outside of the boundaries of said articles to cause the layers to adhere together and seal the article between the layers.

19. The method of wrapping articles which comprises the steps of moving layers of thermosealing wrapping material into superimposed relation, placing articles between said layers, heating said layers to a temperature to make them tacky, and moving the superimposed layers and articles between moving substantially parallel layers of sponge rubber having their opposed surfaces normally so positioned with respect to each other that each acts to compress the other throughout a considerable area in the direction of movement thereof, whereby to press the layers of wrapping material snugly about the articles and into engagement with each other outside of the boundaries of said articles to cause the layers to adhere together and seal the article between the layers.

20. A wrapping machine comprising a pair of endless belts, rotatable elements for supporting the belts with parallel runs of the belt in pressing contact with each other and means for driving said belts, said belts being made of layers of sponge rubber abutting each other in planes at a substantial angle to the outer working surfaces of the belt and being unconnected adjacent that surface.

21. A wrapping machine comprising a pair of endless belts, rotatable elements for supporting the belts with parallel runs of the belt in pressing contact with each other and means for driving said belts, said belts being made of layers of sponge rubber abutting each other in planes at a substantial angle to the outer working surfaces of the belt and being bonded together adjacent the inner surfaces of the belt, but unconnected at the outer working surfaces thereof.

22. A wrapping machine as set forth in claim 20 in which the belt includes an endless substantially inextensible band secured to and supporting said sponge rubber layers.

ALBERT B CLUNAN.
JOSEPH F. STALTER.

REFERENCES CITED

The following references are of record in the file of this patent:

UNITED STATES PATENTS

| Number | Name | Date |
|---|---|---|
| 1,568,594 | Flint | Jan. 5, 1926 |
| 1,983,705 | Pilblad et al. | Dec. 11, 1934 |
| 2,340,260 | Clunan | Jan. 25, 1944 |
| 2,351,475 | Berger | June 13, 1944 |
| 2,356,225 | Cunnington | Aug. 22, 1944 |
| 2,390,803 | Marschner | Dec. 11, 1945 |
| 2,425,581 | Vincent | Aug. 12, 1947 |